(12) United States Patent
Westra

(10) Patent No.: US 6,889,473 B2
(45) Date of Patent: May 10, 2005

(54) FIREFIGHTER TRAINING BUILDING HAVING A RECONFIGURABLE FLOOR PLAN

(75) Inventor: Steven P. Westra, De Forest, WI (US)

(73) Assignee: Fire Facilities, Inc., Sun Prairie, WI (US)

(*) Notice: Subject to any disclaimer, the term of this patent is extended or adjusted under 35 U.S.C. 154(b) by 0 days.

(21) Appl. No.: 10/126,989

(22) Filed: Apr. 20, 2002

(65) Prior Publication Data

US 2003/0198923 A1 Oct. 23, 2003

(51) Int. Cl.[7] ............................ E04B 1/343; E05D 15/06
(52) U.S. Cl. ........................ 52/64; 52/243.1; 52/126.3; 434/226; 160/196.1; 16/87 R
(58) Field of Search ...................... 52/64, 243.1, 126.3, 52/126.2, 126.7; 434/226; 160/196.1, 40; 16/87 R, 90, 93 R, 94 R; 49/409

(56) References Cited

U.S. PATENT DOCUMENTS

| | | | | |
|---|---|---|---|---|
| 797,909 A | * | 8/1905 | Neff | 16/93 R |
| 1,716,625 A | * | 6/1929 | Dawson | 52/243.1 |
| 2,754,535 A | * | 7/1956 | Plemeng | 16/87 R |
| 2,784,444 A | * | 3/1957 | Greig | 16/87 R |
| 3,235,915 A | * | 2/1966 | Glaser | 52/64 |
| 3,557,499 A | * | 1/1971 | Dickie et al. | 52/36.4 |
| 3,683,100 A | * | 8/1972 | Deal et al. | 174/48 |
| 3,748,793 A | * | 7/1973 | Tompkins et al. | 52/64 |
| 4,277,920 A | * | 7/1981 | Dixon | 52/64 |
| 4,841,689 A | * | 6/1989 | Schussler | 52/64 |
| 4,987,638 A | * | 1/1991 | Ribaudo | 16/89 |
| 5,054,295 A | * | 10/1991 | Goulooze | 62/239 |
| 5,203,707 A | * | 4/1993 | Musto et al. | 434/226 |
| 5,461,829 A | * | 10/1995 | Lehto et al. | 49/409 |
| 5,752,835 A | * | 5/1998 | Whitmer, Sr. | 434/226 |
| 6,082,053 A | * | 7/2000 | Bischof et al. | 52/64 |
| 6,179,620 B1 | * | 1/2001 | Schmid | 434/226 |
| 6,336,247 B1 | * | 1/2002 | Schnoor | 16/87.6 R |

FOREIGN PATENT DOCUMENTS

| | | | | |
|---|---|---|---|---|
| FR | 2802326 A1 | * | 6/2001 | G09B/9/00 |
| GB | 2292684 A | * | 3/1996 | A62C/39/00 |

OTHER PUBLICATIONS

Air Combat Command News Service "Firement train in new simulator", Released Feb. 4, 2000, 2 pages.*
"Training Centre Search Building Simulator", Kamloops Fire & Rescue Service, website last updated Oct. 19, 2001, 2 pages.*
Air Combat Command News Service "Firefighters to face heat in new fire simulator", Released Apr. 2, 2002, 2 pages.*
Article Wu to lead fire response and research center (FRRC) dedication, 2 pages.*

* cited by examiner

*Primary Examiner*—Brian E. Glessner
(74) *Attorney, Agent, or Firm*—Joseph W. Byrne

(57) ABSTRACT

A firefighter training building having a system of movable and removable partition walls for changing the interior floor plan layout of the building is disclosed. The system includes a plurality of tracks disposed above the movable walls and a plurality of movable and removable wall panels slidably mounted on the tracks.

50 Claims, 15 Drawing Sheets

FIREFIGHTER TRAINING BUILDING HAVING A RECONFIGURABLE FLOOR PLAN

FIELD OF THE INVENTION

The present invention relates generally to training structures for firefighters. More specifically, it relates to a firefighter training building having a system of movable and removable partition walls for changing the interior floor plan or layout of the building.

BACKGROUND OF THE INVENTION

Firefighting is an inherently dangerous occupation. It is therefore important for firefighters to be well trained. As with many occupations, the best way to train firefighters is through hands on experience. Unfortunately, hands on training when dealing with firefighting is also dangerous because it typically requires the use of real fires, real heat and real smoke.

To provide for hands on training in a safe environment, firefighters typically train using specially designed and specially constructed buildings or towers. The term training building (also referred to as training structure or training facility), as used herein, means a building that is specially designed, built and constructed for the primary purpose of training firefighters through the use of hands on training (e.g., training using one or more of fire, heat or smoke). Training buildings are not designed or built for the purpose of occupancy.

As mentioned above, firefighter training structures are specifically designed, configured, built and constructed for the primary purpose of training firefighters. They typically include special features not generally found on other buildings. For example, they may include one or more of the following special features: chop out hatches, rappelling rings, propane systems, fire department connections, and an artificial smoke distribution system. It should be noted that training structures may include one, more than one, or none of these features and may include other special features not specifically mentioned herein.

In addition to having special features, firefighter training buildings are also specially constructed using special materials. For example, they are typically built to withstand the high heat that can be generated by a live, continuously burning, training fire. The heat from these training fires can reach 600 to 1200 degrees Fahrenheit or higher.

Many prior art firefighter training buildings are built using metal framing (e.g., metal studs and joists), metal floor decking, metal roof decking and metal siding. These metal components are generally manufactured using galvanized metal or stainless steel. Metal components are used because they do not burn and they do not rot. Stainless steel and/or galvanized metal are used because these materials do not rust. It should be noted that prior art training structures are not limited to metal framed structures. Other prior art training buildings, for example, have poured concrete walls (or walls made from concrete block) and upper level poured concrete floor decks.

These structures can also handle large volumes of water. The floor on the ground level of many training structures, for example, is typically sloped. This allows water to quickly run out of the building. These floors, which are typically made of poured concrete, generally have slopes on the order of ⅛" to ¼" per foot. In addition to the ground floor, higher level floors that are made of concrete (or other impermeable materials) also typically slope to allow for water run-off.

Firefighter training structures are also built to handle heavy loads. The floors and roofs in these training structures are typically rated to support live loads on the order of 70 lbs/sq ft to 100 lbs/sq ft. In comparison, most residential and commercial structures have floors that are rated to handle live loads on the order of only 40 lbs/sq ft and roofs that are designed to handle live loads on the order of 30 lbs/sq ft to 50 lbs/sq ft.

The term live load, as used herein, means the load that is created by anything that can move or be moved (e.g., the load created by equipment, firefighters, water, etc.). In comparison, the term dead load, as used herein, means the load created by anything that is permanently attached to the building and therefore not movable (e.g., the load created by the roof itself).

The interior of prior art training structures typically includes at least one room on each floor, although some prior art training structures contain more than one interior room on each floor. The building may also include a specially designed live fire burn room adjacent to the other room or rooms in the building. The live fire burn room is typically located on the ground floor although it can be located on other floors. Other prior art training buildings include no live fire burn rooms or more than one live fire burn room.

The term burn room (or live fire burn room), as used herein, means a room having specially insulated walls and a specially insulated ceiling such that the heat generated by repeated training fires located inside of the burn room does not damage the rest of the building. For example, some prior art burn rooms can withstand continuous heat of 1200 degrees Fahrenheit. Similarly, the walls of some prior art burn rooms are insulated such that the outside surface of the wall will not exceed 300 degrees Fahrenheit when the temperature on the inside surface of the wall (e.g., inside of the burn room) is 1200 degrees Fahrenheit or less.

The actual live training fire that is used during training is typically contained in, and confined to, the burn room. Smoke from the fire contained in the burn room generally escapes out into and fills the other rooms located in the training building. Firefighters must then make there way through the other smoke filled rooms of the building for search and rescue training operations and to extinguish the training fire.

The interior rooms in most prior art training structures are either wide open or have permanent fixed interior partition walls, These walls are generally provided to make it more difficult for the firefighter to make his or her way through the building during training exercises. Regardless of whether or not the interior rooms are wide open or include permanent fixed partition walls, once the firefighter learns the fixed layout of the training structure, the training aspect of using the building is severely diminished. This is because the firefighter becomes familiar with the layout of the building and learns the exact location of the training fire inside of the structure. It is desirable, therefore, to have a training building having floor plans that can be changed. Preferably, the floor plans will be easy to reconfigure without the use of any tools.

In an attempt to overcome the problem of layout familiarity, many fire departments randomly place objects on the floor around the interior of the rooms. Other departments clamp objects to the permanent walls or hang objects from the ceiling of the rooms. For example, plywood sheets have been hung from the ceiling in these rooms in an attempt to change the layout of the rooms.

These makeshift solutions suffer from several problems however. Objects placed randomly on the floor of the training structure create a tripping hazard. Plywood sheets that are clamped to walls or hung from ceiling joists are generally secured to the building in a makeshift manner because the building was not designed for such purpose. Furthermore, plywood sheets hung from the ceiling are typically not secured to the floor in any manner. As a result, the bottom of these plywood sheets swing freely when bumped. If bumped hard enough during training exercises, they can even become disconnected from the ceiling.

All of these problems are amplified when one considers that these objects are placed in a room where visibility is low do to darkness and thick black smoke. It is further desirable, therefore, to have a reconfigurable room partitioning system that is safe and easy to use and does not suffer from the problems associated with the makeshift solutions discussed above.

SUMMARY OF THE PRESENT INVENTION

According to a first aspect of the invention, a firefighter training apparatus includes a training building and a movable wall. The training building is specially designed for the purpose of training firefighters. The movable wall is disposed inside of the training building and can be moved to change the floor plan of the training building.

The movable wall is slidably mounted inside of the building in one embodiment and is slidably disposed on a track in a second embodiment. The movable wall is further configured for removal from the building without the use of tools and from the track without the use of tools in other embodiments and the track is disposed above the movable wall in another embodiment. The movable wall is comprised of a plurality of individual movable wall panels in yet one other embodiment.

The wall is movable to a first position defining a first floor plan in one embodiment and is configured to be locked in the first position in this embodiment. The movable wall includes a locking device in another embodiment and activation of the locking device locks the movable wall in the first position. The locking device is a pressure device and is disposed near the bottom of the movable wall in other embodiments.

In an alternative embodiment, the movable wall includes a top and a bottom. Both the top and bottom are configured to be secured in this embodiment. The movable wall includes a locking device and activation of the locking device secures the movable wall both at the top and at the bottom in one embodiment. The locking device is a compression device and is disposed at the bottom of the movable wall in two other embodiments.

The building includes a floor and a ceiling and the movable wall is configured to be secured between the floor and the ceiling in one other alternative embodiment. The movable wall includes a locking device and activation of the locking device secures the movable wall between the floor and the ceiling in another embodiment. The locking device is a pressure device and the locking device is disposed between the movable wall and the floor after activation in other embodiments.

In other embodiments, the training building includes a live fire burn room, at least one chop out hatch or at least one rappelling ring.

The training building includes a sloped floor in one embodiment. In another embodiment, the training building includes a ceiling and the movable wall is configured to be secured between the floor and the ceiling in this embodiment. The movable wall includes a pair of locking devices and activation of the pair of locking devices secures the movable wall between the floor and the ceiling in yet another embodiment.

The training building includes a roof having a rated live load capacity of greater than 70 pounds per square foot in one embodiment and at least one upper level floor deck having a rated live load capacity of greater than 70 pounds per square foot in another embodiment.

The training building further includes a first track and a second track in one other embodiment. The first track is mounted in the training building and includes a first bottom wall having first and second opposing outer edges and a first sidewall extending upward and having top and bottom ends. The bottom end is attached to the first bottom wall. The second track is attached to the movable wall and configured for slidable engagement with the first track. The second track includes a second bottom wall, second and third sidewalls extending upward from the second bottom wall, and a flange member attached to the second sidewall and extending inward above the second bottom wall from the second sidewall toward the third sidewall. During slidable engagement of the second track with the first track, the second sidewall is disposed adjacent to, and extends upward above, the first outer edge of the first bottom wall. Likewise, the third sidewall is disposed adjacent to, and extends upward above, the second outer edge of the first bottom wall. The flange member is disposed over the top of the first sidewall.

The training building includes a floor and a ceiling and the movable wall includes a locking device in another embodiment. Activation of the locking device locks the movable wall between the floor and the ceiling in this embodiment. The movable wall includes a top and a bottom and further includes a locking device in an alternative embodiment. Activation of the locking device secures the movable wall both at the top and at the bottom in this alternative embodiment.

According to a second aspect of the present invention, a firefighter training apparatus includes a training building having as it primary purpose the training of firefighters and a room partitioning system. The room partitioning system includes a plurality of walls movable to a first position to define a first floor plan and a second position to define a second floor plan different from the first floor plan.

The plurality of walls are slidably mounted inside of the building in one embodiment. The plurality of walls are each configured to be removed from the building without the use of tools in another embodiment. The training apparatus further includes a plurality of tracks in one embodiment and the plurality of walls are configured for slidable engagement with the plurality of tracks in this embodiment. The plurality of walls are each configured to be removed from the plurality of tracks without the use of tools in another embodiment. Each of the plurality of walls includes a locking device disposed to secure each of the plurality of walls at a desired location inside of the training building in yet another embodiment.

According to a third embodiment of the present invention, a room partitioning system for a firefighter training building includes a first track and a second track configured for slidable engagement with the first track. The first track includes a first bottom wall having first and second opposing outer edges and a first sidewall extending upward and having top and bottom ends. The bottom end is attached to the first bottom wall. The second track includes a second bottom wall, second and third sidewalls extending upward from the second bottom wall, and a flange member attached to the second sidewall and extending inward above the second bottom wall from the second sidewall toward the third sidewall. During slidable engagement of the second track with the first track, the second sidewall is disposed adjacent to, and extends upward above, the first outer edge of the first bottom wall, the third sidewall is disposed adjacent to, and extends upward above, the second outer edge of the first bottom wall, and the flange member is disposed over the top of the first sidewall.

In other embodiments, the first sidewall is attached to the first bottom wall at the first outer edge of the first bottom wall, the flange member is angled downward from horizontal, the third sidewall is shorter than the second sidewall, or the first sidewall is disposed between the second sidewall and the flange member during slidable engagement of the second track with the first track.

The room partitioning system includes a movable wall attached to the second track in one embodiment. The first track is configured to be attached to a structure disposed above the movable wall in another embodiment. The room partitioning system further includes a locking device and activation of the locking device forces the second bottom wall of the second track upward toward the first bottom wall of the first track in one other embodiment. The locking device is a pressure device in yet another embodiment. In an alternative embodiment, the apparatus includes a locking device, wherein deactivation of the locking device allows the movable wall to slide along the first track and activation of the locking device prohibits the movable wall from sliding along the first track.

According to a fourth aspect of the present invention, a room partitioning system for a firefighter training building includes a first track, a movable wall and a second track attached to the movable wall and configured for slidable engagement with the first track. The first track includes a bottom wall and an upwardly directed sidewall and the second track can be disengaged from the first track only when the second track is tilted at an angle relative to the first track.

According to a fifth aspect of the present invention, a room partitioning system for a firefighter training building includes a first track, a second track configured for slidable engagement with the first track and a movable wall attached to the second track. The first track includes a first channel and the second track includes a second channel. During slidable engagement of the second track with the first track, the first channel is disposed in the second channel.

In one embodiment, he second track includes an inwardly directed flange member disposed such that during slidable engagement of the second track with the first track, the flange member extends from the second channel over the first channel. The second channel is defined by a bottom wall, a first sidewall and a second sidewall in another embodiment. The second sidewall is shorter than the first sidewall in this embodiment.

Other principal features and advantages of the invention will become apparent to those skilled in the art upon review of the following drawings, the detailed description and the appended claims.

Figure 1:
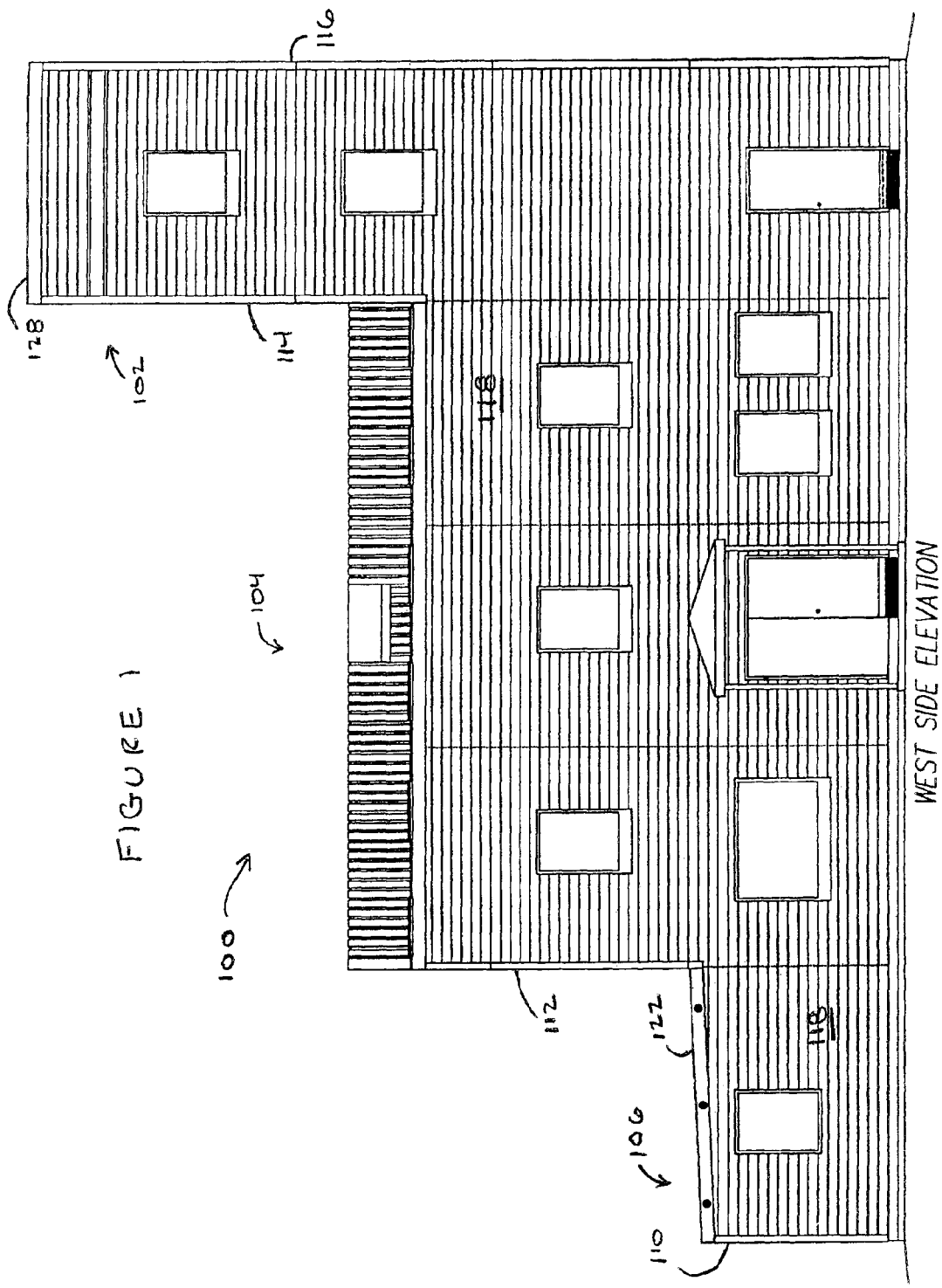
FIG. 1 shows a front elevation view of a firefighter training building according to one embodiment of the present invention.

Before explaining at least one embodiment of the invention in detail it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting. Like reference numerals are used to indicate like components.

DETAILED DESCRIPTION OF THE PREFERRED EMBODIMENTS

While the present invention will be illustrated with reference to a particular firefighter training building having a particular configuration and particular features, the present invention is not limited to this configuration or to these features and other configurations and features can be used. Likewise, although the present invention will be illustrated with reference to a particular room partitioning system having a particular configuration and particular features, the present invention is not limited to this configuration or to these features and other room partitioning systems having other configurations and other features can be used.

Generally, the present invention involves a firefighting training building specially designed for the purpose of training firefighters. The training structure includes a live fire burn room for containing the fire in one embodiment. In addition to the live fire burn room, the training structure also includes one or more additional rooms. Smoke created by the fire in the burn room escapes from the burn room and fills the remaining rooms of the structure.

At least one of the additional rooms includes a reconfigurable room partitioning system, including one or more movable partition walls. The movable partition walls can be removed without the use of any tools in another embodiment. The floor plan or layout of the training building can be changed easily and quickly by simply moving or removing one or more of the movable partition walls. In this way, the training potential of the building is greatly enhanced.

Each movable partition wall is slidably mounted on a track attached to the ceiling of the room in one embodiment. Once moved to a desired location within the room, each movable partition wall can be secured or locked in place at that location. This includes securing both the top and bottom ends of the walls in place. Once secured, the movable wall can no longer slide on the track.

The movable wall is locked or secured in place using a locking device, such as a pressure or compression device in one embodiment. One or more locking devices are disposed at the bottom of each movable wall. Activation of the locking device forces the movable wall upward thereby wedging the movable wall between the floor and ceiling of the room.

Figure 2:
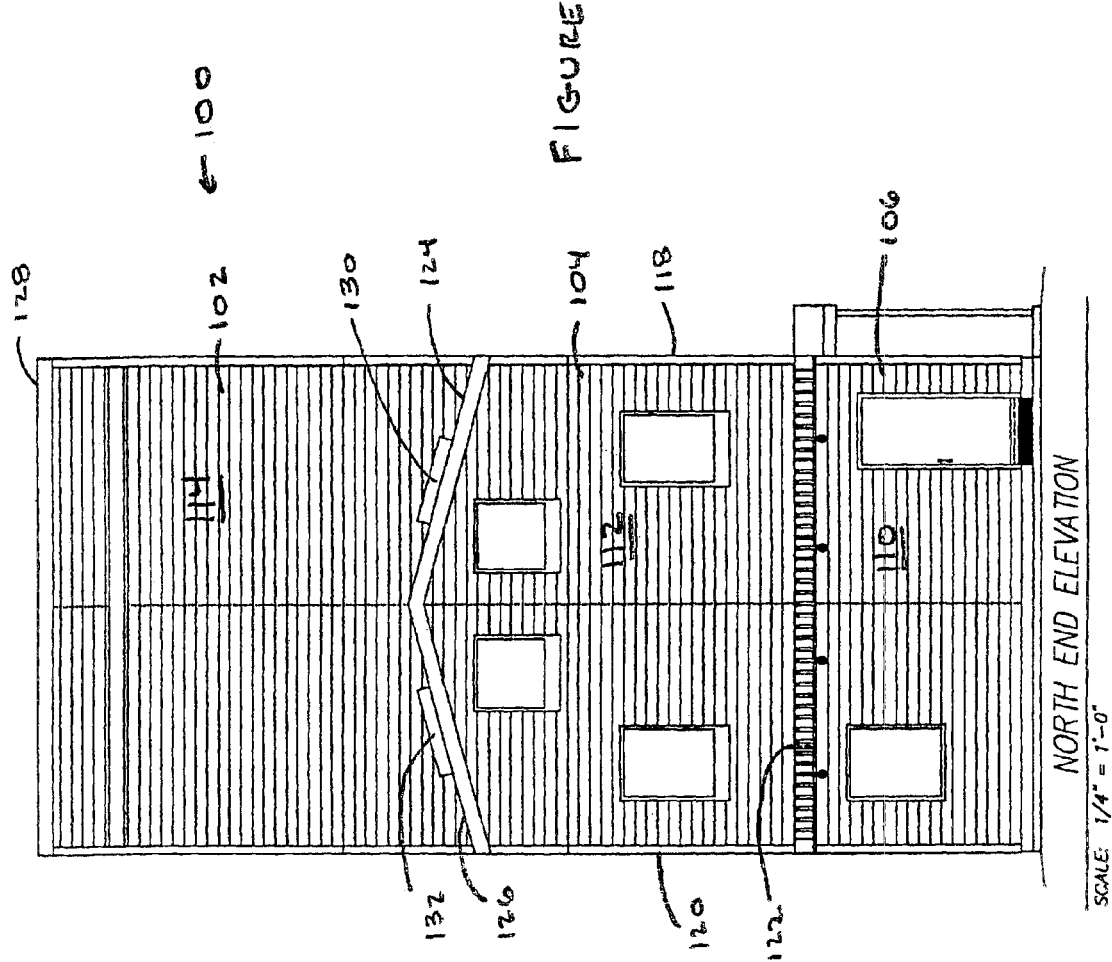
FIG. 2 shows a side elevation view of the firefighter training building of FIG. 1.

FIGS. 1 and 2 show various elevation views of a firefighting training structure 100 according to one embodiment of the present invention. Training structure 100 includes a four story tower section 102, a two story residence section 104 and a one story annex section 106 in this embodiment. Annex section 106 includes a live fire burn room 108.

In other embodiments of the present invention, the training building is comprised of only one or two of tower section 102, residence section 104 or annex section 106. In other embodiments, the entire training building is a single story building or is entirely a multi-story building. Other embodiments of the present invention, likewise have other configurations not described herein.

Training structure 100 also includes a plurality of exterior walls 110, 112, 114, 116, 118, 120 and a plurality of roof sections 122, 124, 126, 128. Various doors and windows are provided in each of the exterior walls as shown in FIGS. 1 and 2. Likewise, chop out hatches 130, 132 are also provided in roof sections 124, 126. Chop out hatch, as used herein, means a hatch that is specifically designed and built for the purpose of being chopped out during firefighter training. Chop out hatches are therefore designed to be repeatedly reused.

The various roof sections of training structure 100 have a rated live load capacity of 100 pounds/square foot in one embodiment. In another embodiment, the roof sections have a rated live load capacity of 70 pounds/square foot. In other embodiments, the roof sections have a rated live load capacity of approximately 70 pounds/square foot or approximately 100 pounds/square foot. In yet other embodiments, depending on the training application, the roof sections have a rated live load capacity that is greater than 70 pounds/square foot, greater than 80 pounds/square foot, or greater than 90 pounds/square foot.

Training structure 100 is built on top of a poured concrete slab in this embodiment which forms the floor on the first story or level of the structure. The floor is purposely sloped in this embodiment ¼ inch per foot (1.2 degree slope) to allow for quick water run-off. In other embodiments, depending on the training application, the floor purposely slopes at a rate of ⅛ inch per foot (0.6 degree slope), at a rate greater than ⅛ inch per foot or at a rate greater than ¼ inch per foot.

Figure 3:
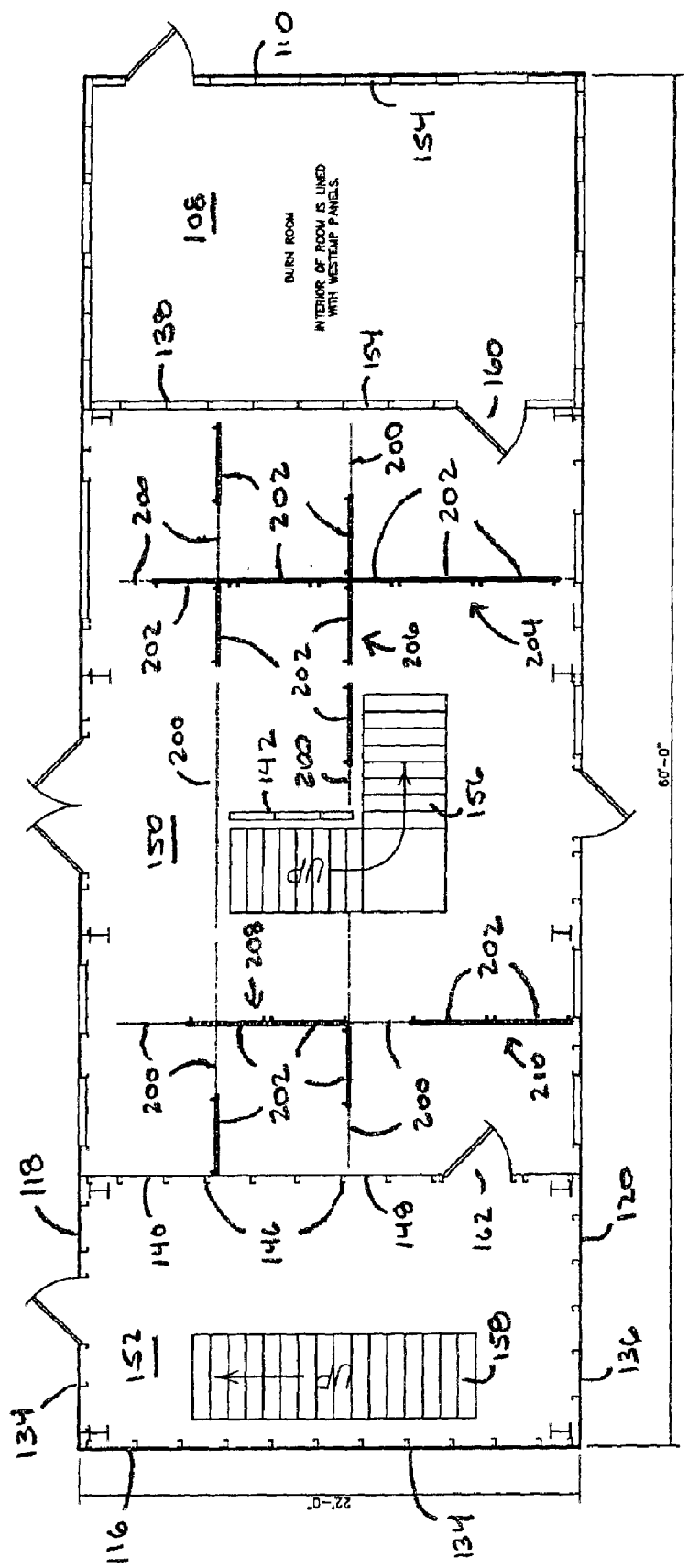
FIG. 3 shows the first story reconfigurable floor plan of the firefighter training building of FIG. 1.
Figure 4:
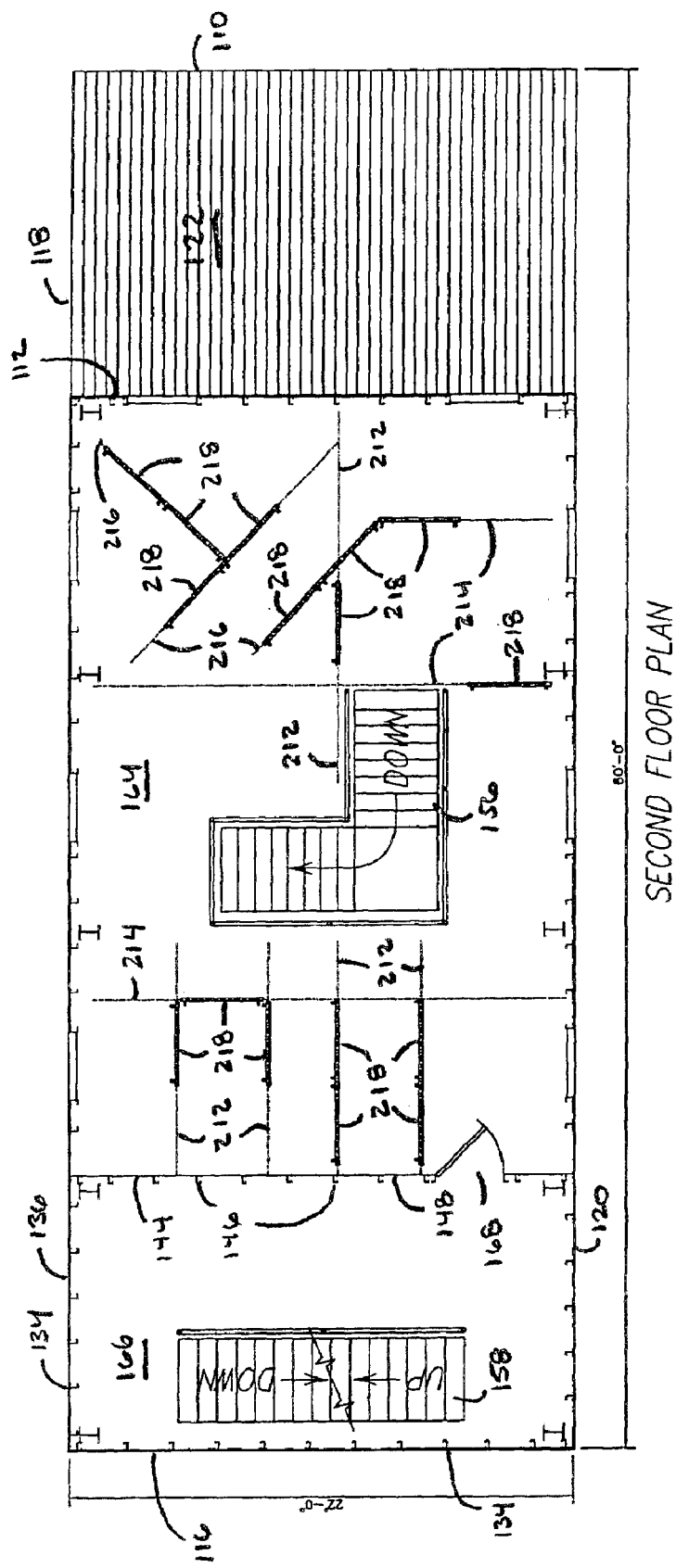
FIG. 4 shows the second story reconfigurable floor plan of the firefighter training building of FIG. 1.

FIGS. 3 and 4 show the floor plans for the first and second stories (levels) respectively of training structure 100. Each exterior wall of structure 100 includes a plurality of equally spaced apart metal studs 134 arranged around the perimeter of the structure. 18 gauge metal siding 136 is fastened to the outside of each metal stud to form the exterior walls of the training structure.

The first and second floors of training structure 100 also include a plurality of permanent fixed interior walls. For example, permanent fixed interior walls 138, 140, 142 are located on the first floor of training building 100. A permanent fixed interior wall 144 is also provided on the second floor of training building 100. Each interior wall is comprised of a plurality of equally spaced apart metal studs 146 that are fixed in place. 18 gauge metal siding 148 is fastened to one side of the metal studs to form the walls.

The term wall or wall panel, as used herein, means any structure that either connects or is configured to connect, the ceiling with the floor of a building. The terms wall and wall panel include structures that themselves contact both the ceiling and the floor and structures wherein contact is made through another structure mounted to or in contact with the first structure (e.g, via a track or tracks, a clamp, a locking device, a pressure element, etc . . . ). Free swinging plywood sheets hung from the ceiling of a structure, therefore, are not walls or wall panels as those terms are used herein.

As seen in FIG. 3, the first floor of training structure 100 is divided into three separate interior rooms 108, 150, 152 by interior walls 138 and 140. Room 108 is a burn room in this embodiment. The walls and ceiling of burn room 108 are lined with special insulating panels 154 to keep heat from escaping out of the burn room, thereby preventing damage to the rest of the structure. One type of insulating panel that is used to insulate burn rooms is sold by the current assignee of this application under the brand name Westemp®.

It should be noted that in an alternative embodiment of the present invention, no burn room is provided. Rather, smoke is provided by an artificial smoke generating apparatus and is distributed throughout the structure by means of an artificial smoke distribution system (e.g., piping and a fan unit).

Room 150, which is located on the first floor of residence section 104, includes an L-shaped stairway 156 leading to the second floor of the residence section. Likewise, room 152 located on the first floor of tower section 102 includes a stairway 158 leading to the second floor of the tower section. A first interior doorway 160 connects room 150 with burn room 108 and a second interior doorway 162 connects room 150 with room 152.

The second level of training structure 100 is divided into two separate interior rooms 164, 166. Room 164 is located in residence section 104 directly above room 150 and is connected to room 150 by way of stairway 156. Room 166 is similarly located in tower section 102 directly above room 152 and is connected to room 152 via stairway 158. Interior wall 144 separates room 164 from room 166. A single interior doorway 168 connects room 164 with room 166 on the second floor.

Each of the upper level floor decks of training building 100 are comprised of a plurality of equally spaced apart floor joists that run parallel to exterior walls 118, 120. The floor joists are covered with 18 gauge metal floor decking. The underside of the floor joists, however, are not covered and thus are exposed. The exposed floor joists form the ceiling of the rooms located directly below each floor deck.

It should be noted that the term ceiling, as used herein, includes any overhead structures in a room regardless of whether or not those structures are covered up. For example, ceiling as used herein, includes the floor joists of the floor directly above as well as any covering that may be placed over the underside of those floor joists. Ceiling, as used herein also includes cross members disposed between, or mounted to, the floor joists of the floor above.

The various upper level floor decks of training structure 100 have a rated live load capacity of 100 pounds/square foot in one embodiment of the present invention. In another embodiment, the upper level floor decks have a rated live load capacity of 70 pounds/square foot. In other embodiments, the upper level floor decks have a rated live load capacity of approximately 70 pounds/square foot or approximately 100 pounds/square foot. In yet other embodiments, depending on the training application, the upper level floor decks have a rated live load capacity that is greater than 70 pounds/square foot, greater than 80 pounds/square foot, or greater than 90 pounds/square foot.

All of the internal and external walls described thus far are permanent and fixed in that they can not be moved or repositioned. They also are not removable. Thus, the interior and exterior walls thus far described define the basic layout (e.g., fixed layout) or floor plan for training structure 100. The terms basic or fixed floor plan or layout, as used herein, mean the floor plan or layout of the training building defined by the permanent fixed walls of the structure.

In addition to the permanent fixed exterior and interior walls described above, training structure 100 also includes a reconfigurable modular room partitioning system. The room partitioning system in this embodiment is comprised of a plurality of tracks and movable/removable walls that allow for reconfiguration or customization of the floor plan of training structure 100. The term reconfigurable floor plan or layout, as used herein, means the floor plans or layouts defined by a reconfigurable partitioning system or by one or more movable partition walls or removable partition walls.

The room partitioning system shown in FIGS. 3 and 4 includes walls that are both movable and removable. In other embodiments, the walls are only movable or are only removable. In yet other embodiments, the walls can be removed without the use of any tools.

The room partitioning system also includes one or more tracks attached to the ceiling of the room (e.g, to the underside of the floor joists in this embodiment). The tracks can be arranged in any number of configurations or patterns within the rooms. One or more of the individual wall panels are slidably disposed or mounted on the tracks at desired locations within the room. In this way, one or more of the movable wall panels can be slid along the tracks, or removed altogether, to easily and quickly configure and reconfigure the interior floor plan layout of the training structure.

The partitioning system shown in FIGS. 3 and 4 is also modular. The individual wall panels are placed next to each other on the tracks to form the larger movable partition walls. A movable partition wall may therefore be comprised of a single movable wall panel or it may be comprised of two or more separate movable wall panels.

One particular floor plan layout provided by a reconfigurable partitioning system in accordance with the present invention is shown in FIG. 3. The partitioning system in this embodiment includes a plurality of tracks 200 and a plurality of movable wall panels 202.

The tracks in this embodiment are mounted to the ceiling of room 150 and as such, are disposed above the movable wall panels. The wall panels are slidably mounted on the tracks. Some of the tracks run parallel with the floor joists while other of the tracks run perpendicular to the floor joists.

As can be seen from FIG. 3, a first movable partition wall 204 is formed from five separate wall panels 202. A second movable wall 206, which intersects wall 204 at a right angle, is formed by two separate wall panels 202. Similarly, two other two panel movable walls 208 and 210 are provided in room 150. The remaining movable walls located in room 150 are formed from a single individual wall panel 202.

The movable walls shown in FIG. 3 are disposed in room 150 to create a reconfigurable (temporary) floor plan layout for the room. If a different floor plan layout is desired for this room, one or more of the wall panels can be moved to a different location along the tracks or can be removed from the tracks altogether. In this way, the interior layout of room 150 can be reconfigured or changed from training session to training session simply by sliding or removing one or more of the individual wall panels.

Room 164 on the second floor of training structure 100 likewise includes a partitioning system having a different configuration of tracks and wall panels. Tracks 212 are mounted to run parallel to the floor joists while tracks 214 are arranged to run perpendicular to the floor joists. Finally, tracks 216 are mounted at an angle (e.g., not a right angle) to the floor joists to which they are attached. Thus, those movable wall panels slidably mounted on tracks 216 are disposed at an angle in room 164.

As with the partitioning system located on the first floor of training structure 100, individual wall panels 218 are shown in one of many possible configurations in FIG. 4. One or more of the individual wall panels 218 could be relocated or removed to alter the temporary floor plan layout of room 164.

It should be noted that the present invention is not limited to the reconfigurable floor plans shown in FIGS. 3 and 4 and other floor plans can be used. In addition, the present invention is not limited to the number of tracks or to the number of wall or wall panels shown in these figures. In other embodiments, the tracks are placed at different locations and more or less tracks and wall panels are provided. For example, in one embodiment of the present invention, the training building includes a single track and a single wall panel or movable wall.

It should also be noted that the present invention is not limited to the use of overhead tracks and individual modular wall panels. In other embodiments of the present invention, floor tracks are provided or no tracks are provided. Likewise, in other embodiments, each partition wall is unitary and is not made up of separate individual wall panels.

Figure 5:
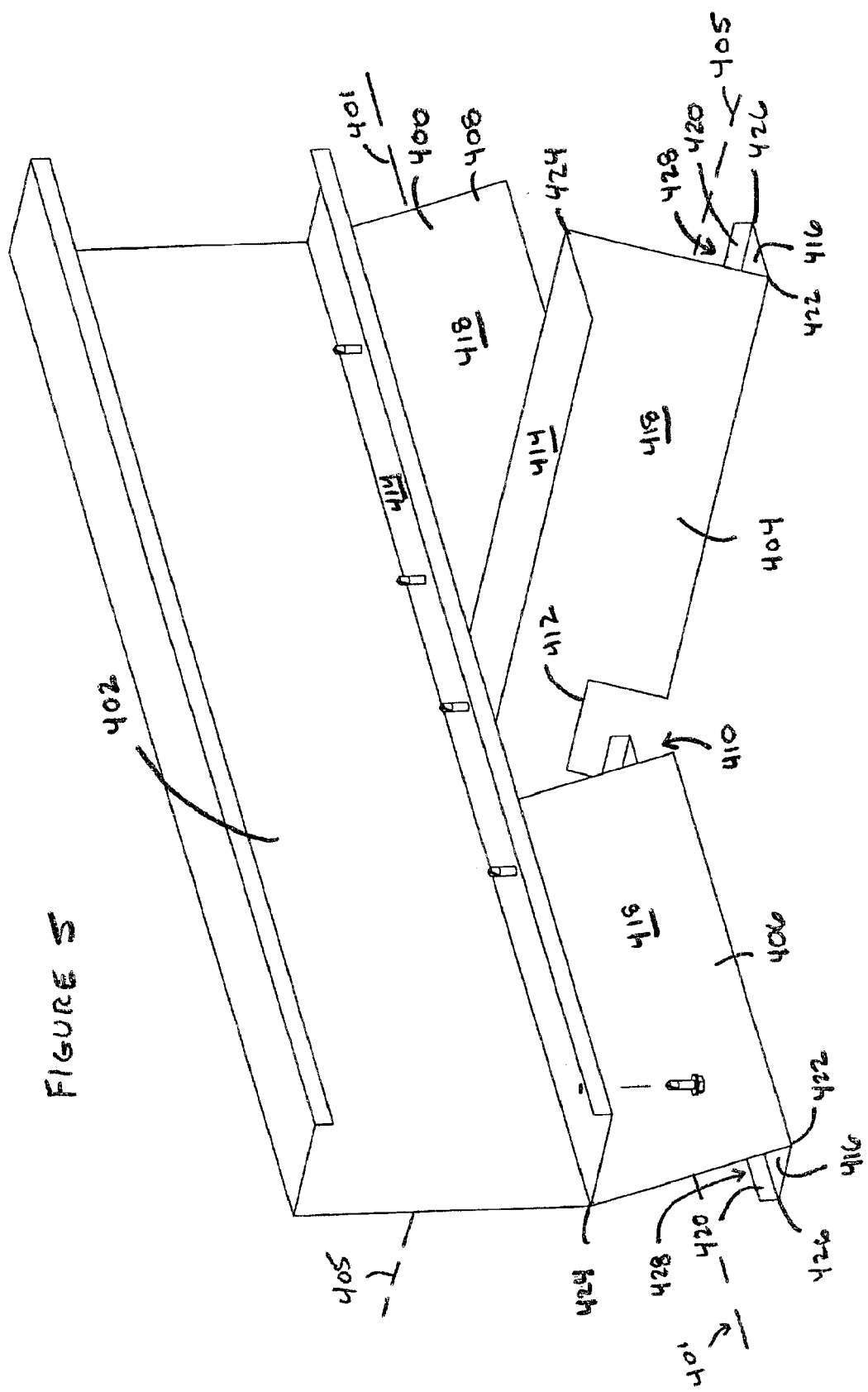
FIG. 5 shows an isometric view of a pair of intersecting hanger tracks according to one embodiment of the present invention.
Figure 6:
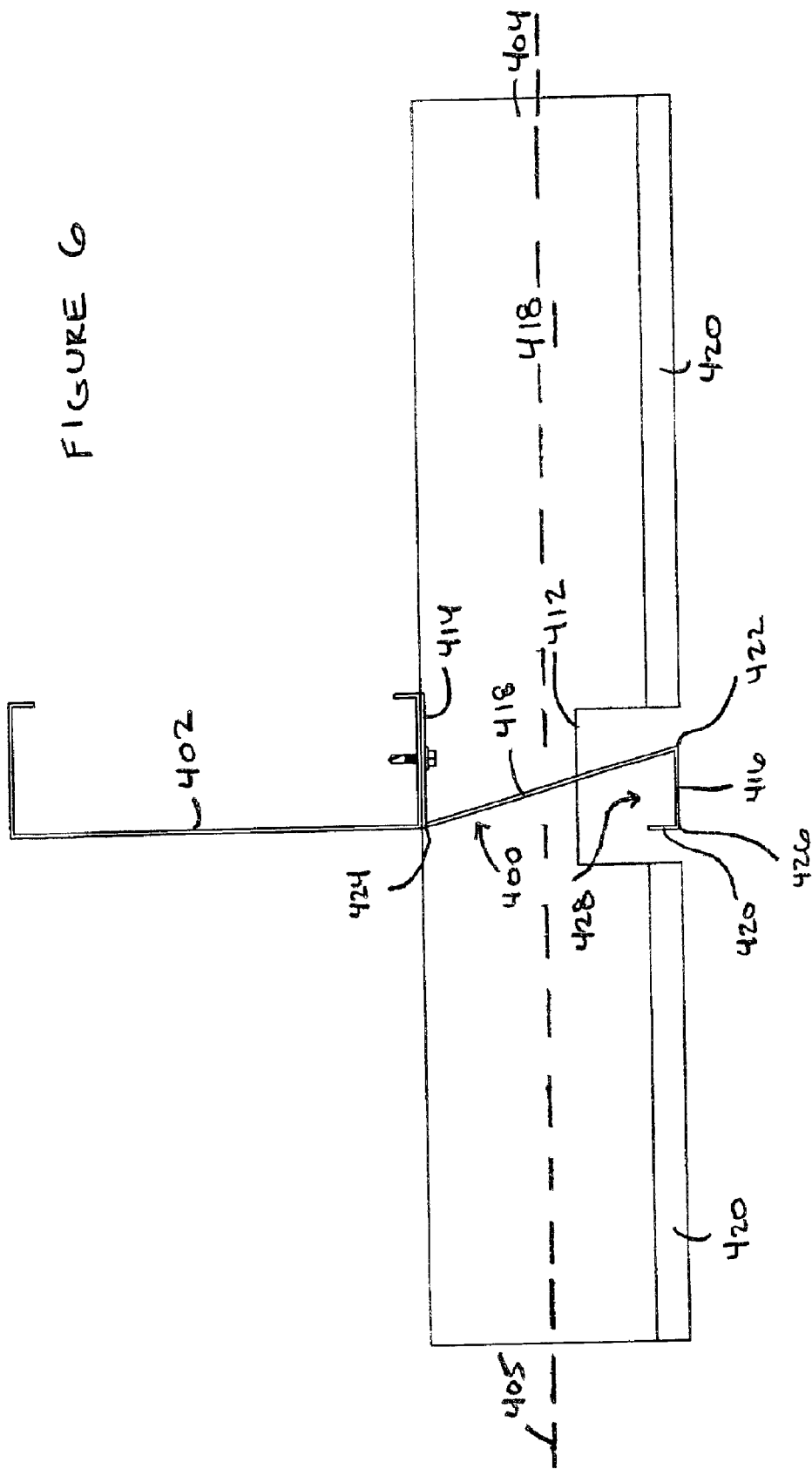
FIG. 6 shows a first side view of the intersecting hanger tracks of FIG. 5.
Figure 7:
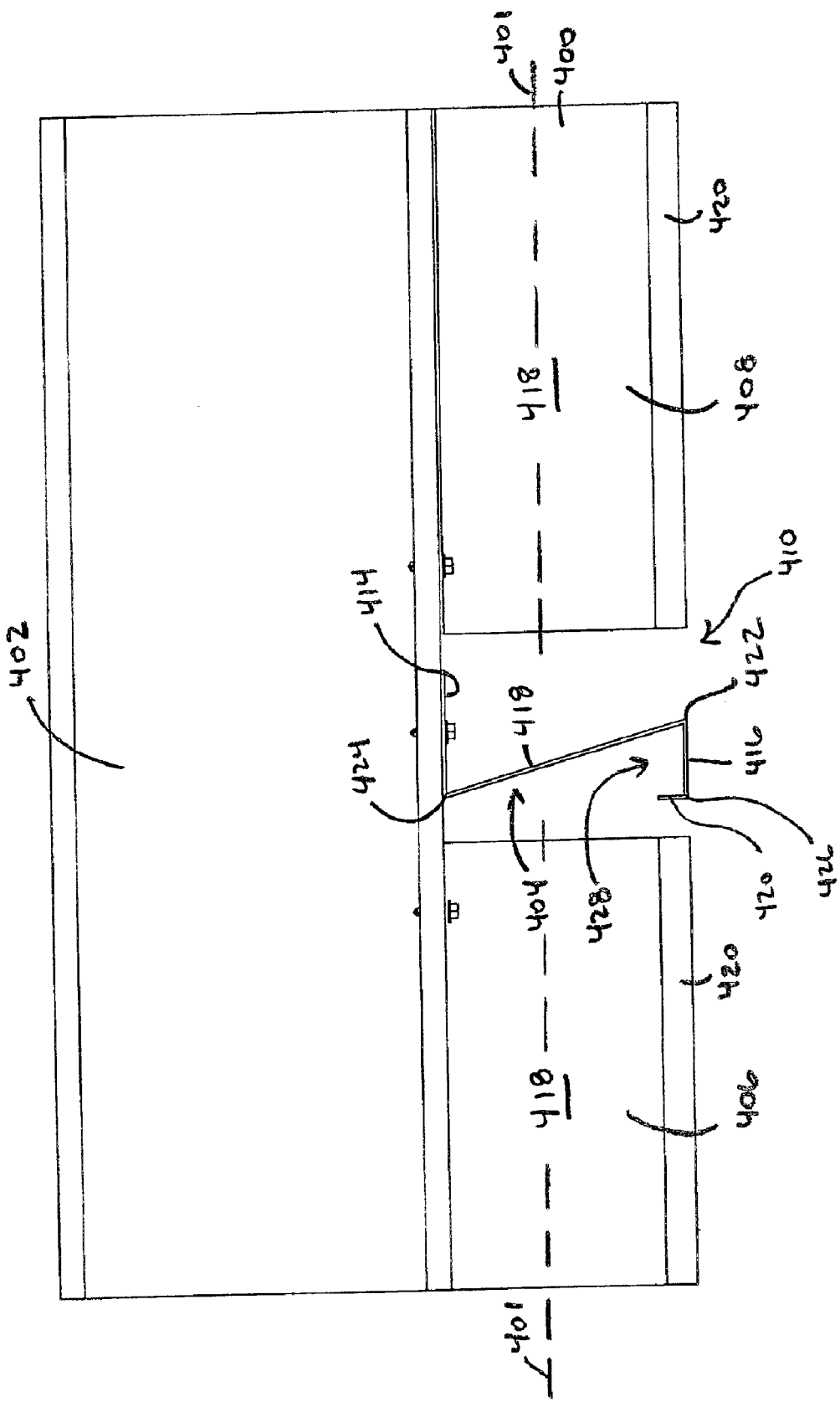
FIG. 7 shows a second side view of the intersecting hanger tracks of FIG. 5.

The details of a modular room partitioning system according to one embodiment of the present invention will now be discussed. FIGS. 5, 6 and 7 show two intersecting hanger tracks (also referred to as ceiling tracks in this embodiment) mounted to the underside of a floor joist. A first elongated hanger track 400 having a first longitudinal axis 401 is shown mounted parallel with, and thus to the underside of a single floor joist 402 using conventional fastening hardware such as screws or bolts. A second elongated hanger track 404 having a second longitudinal axis 405 is shown disposed perpendicular to track 400 and thus perpendicular to floor joist 402. Thus, hanger track 404 is actually mounted to the underside of a plurality of floor joists in this embodiment.

Although hanger tracks 400 and 404 are shown mounted to floor joists in FIGS. 5–7, the present invention is not limited to floor joist mounting and in fact the hanger tracks can be mounted to any structure disposed above the movable wall. For example, in an alternative embodiment, the hanger tracks are mounted to cross members disposed between the floor joists or are directly mounted to the underside of the concrete floor decking of the floor above.

The present invention also does not necessarily require hanger tracks mounted above the movable wall panels. In other embodiments of the present invention, the tracks are mounted on or in the floor. In yet other embodiments, the walls move or slide without the use of any tracks.

Hanger track 400 is actually comprised of two separate hanger track sections 406, 408 separated by gap 410 in this embodiment. Gap 410 is provided at the intersection of tracks 400 and 404. Hanger track 404 also includes a cut-out section 412 located at the intersection of tracks 400 and 404. Gap 410 is provided to allow a wall panel mounted on track 404 to slide through the intersection without interference from track 400. Cut-out 412 is provided in track 404 for the same reason, namely to allow wall panels mounted on track 400 to slide through the intersection without interference from track 404.

Hanger tracks 400 and 404 shown in FIGS. 5–7 have a reverse "Z" shaped cross section in this embodiment and each includes a horizontal (or substantially horizontal) top wall or top flange 414, a horizontal (or substantially horizontal) bottom wall or bottom flange 416, an angled rear sidewall 418 and a front sidewall or lip 420. Rear sidewall 418 extends upward from one outer edge 422 (e.g., rear edge) of bottom wall 416 to an opposite edge 424 of top wall 414. Front sidewall 420 extends vertically upward in this embodiment from the opposite outer edge 426 (e.g., front edge) of bottom wall 416. The combination of front side wall 420, bottom wall 416 and rear sidewall 418 define a channel 428 on hanger tracks 400 and 404.

Figure 8:
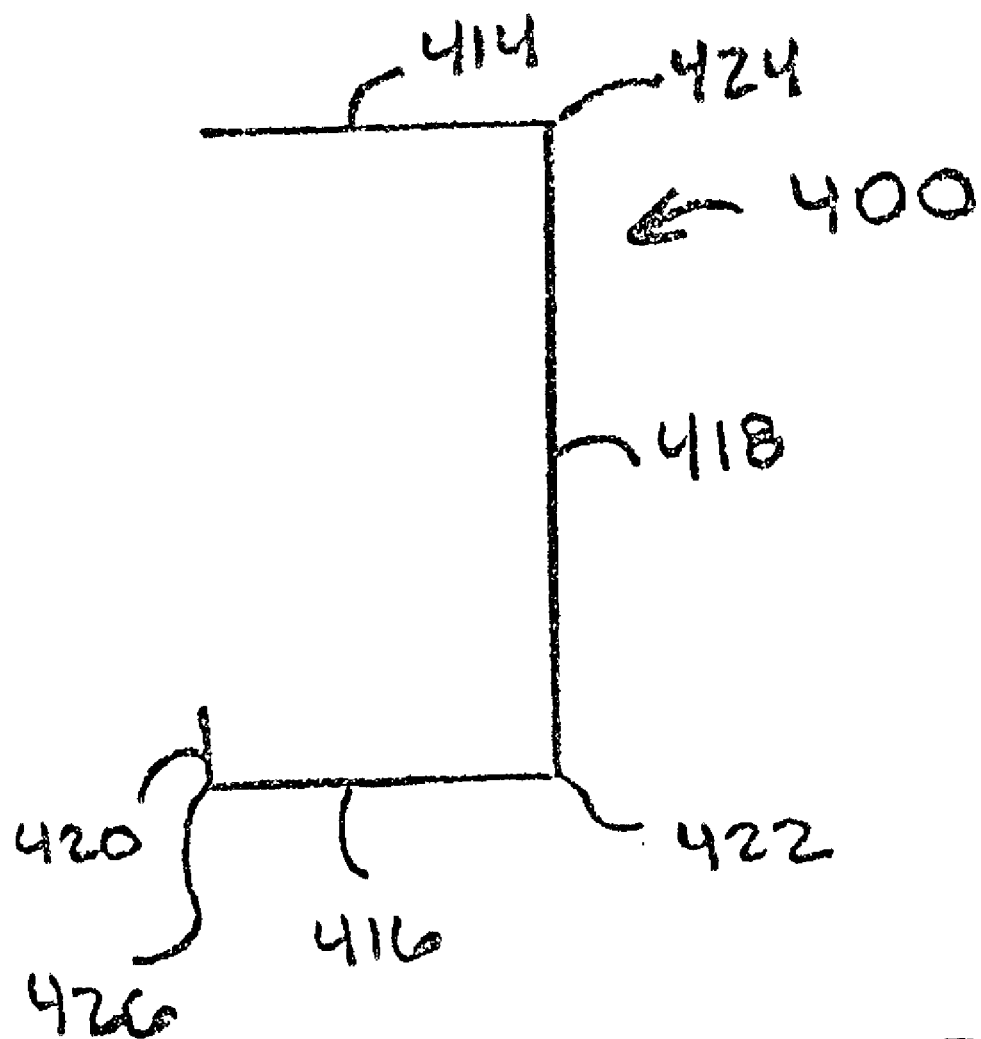
FIG. 8 shows a cross-sectional view of a hanger track according to a second embodiment of the present invention.
Figure 9:
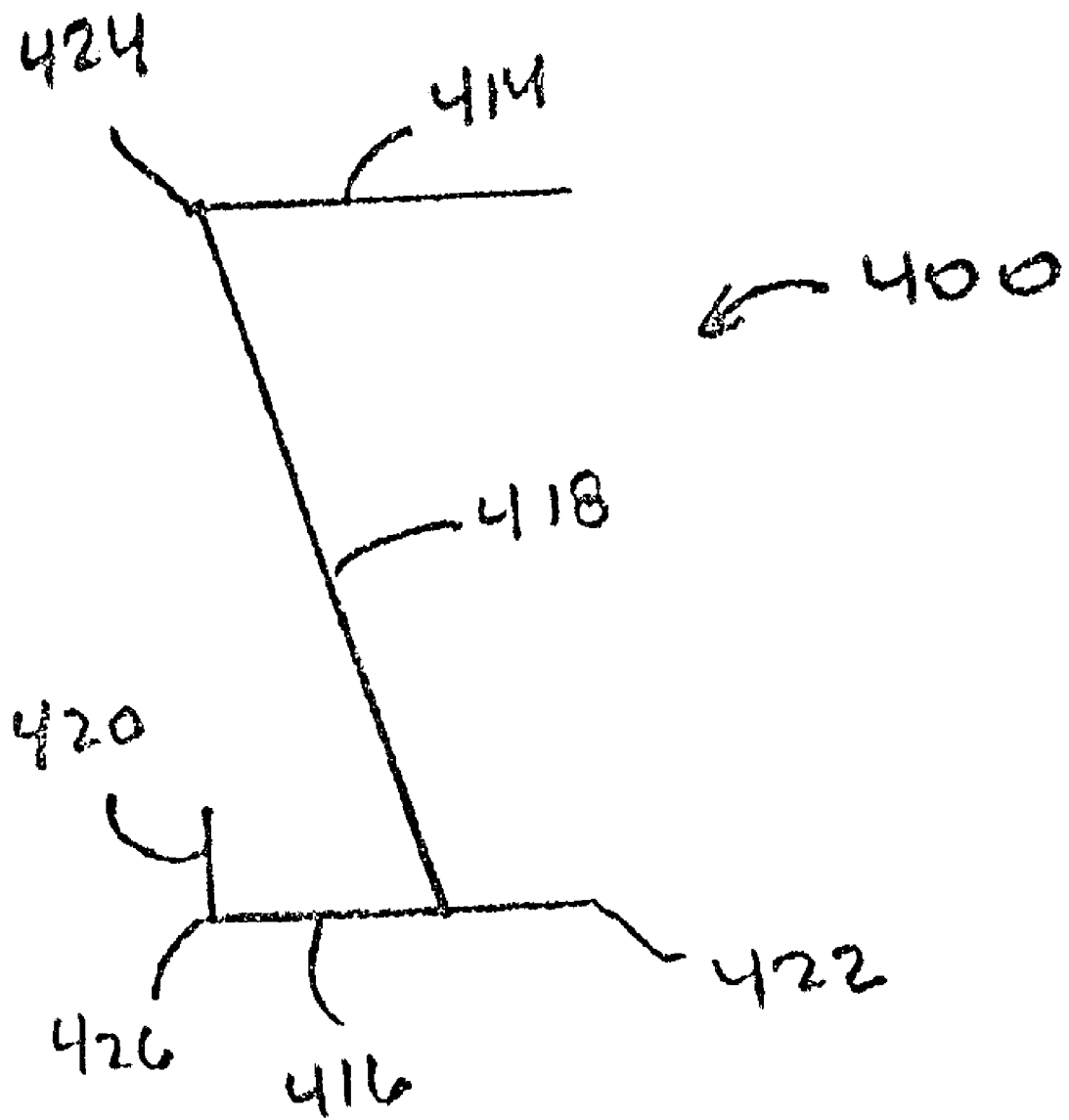
FIG. 9 shows a cross-sectional view of a hanger track according to a third embodiment of the present invention.

In an alternative embodiment of the present invention, rear sidewall 418 is not angled, but rather extends vertically (or substantially vertically) upward from the rear edge 422 (or from a point near the rear edge 422) of bottom wall 416 (see FIG. 8). In other embodiments, rear sidewall 418 is angled or vertical (or substantially vertical) and is connected to bottom wall 416 at a point intermediate the front and rear edges of bottom wall 416 (e.g, rear wall 418 intersects bottom wall 416 at a point between edges 422 and 426) (see FIG. 9). In other embodiments, front sidewall 420 is angled, is substantially vertical, and/or is attached to bottom wall 416 at a point near front edge 426 or at a point intermediate to front and rear edges 422, 426. Likewise, in other embodiments, bottom wall 416 is angled upward or downward.

Figure 10:
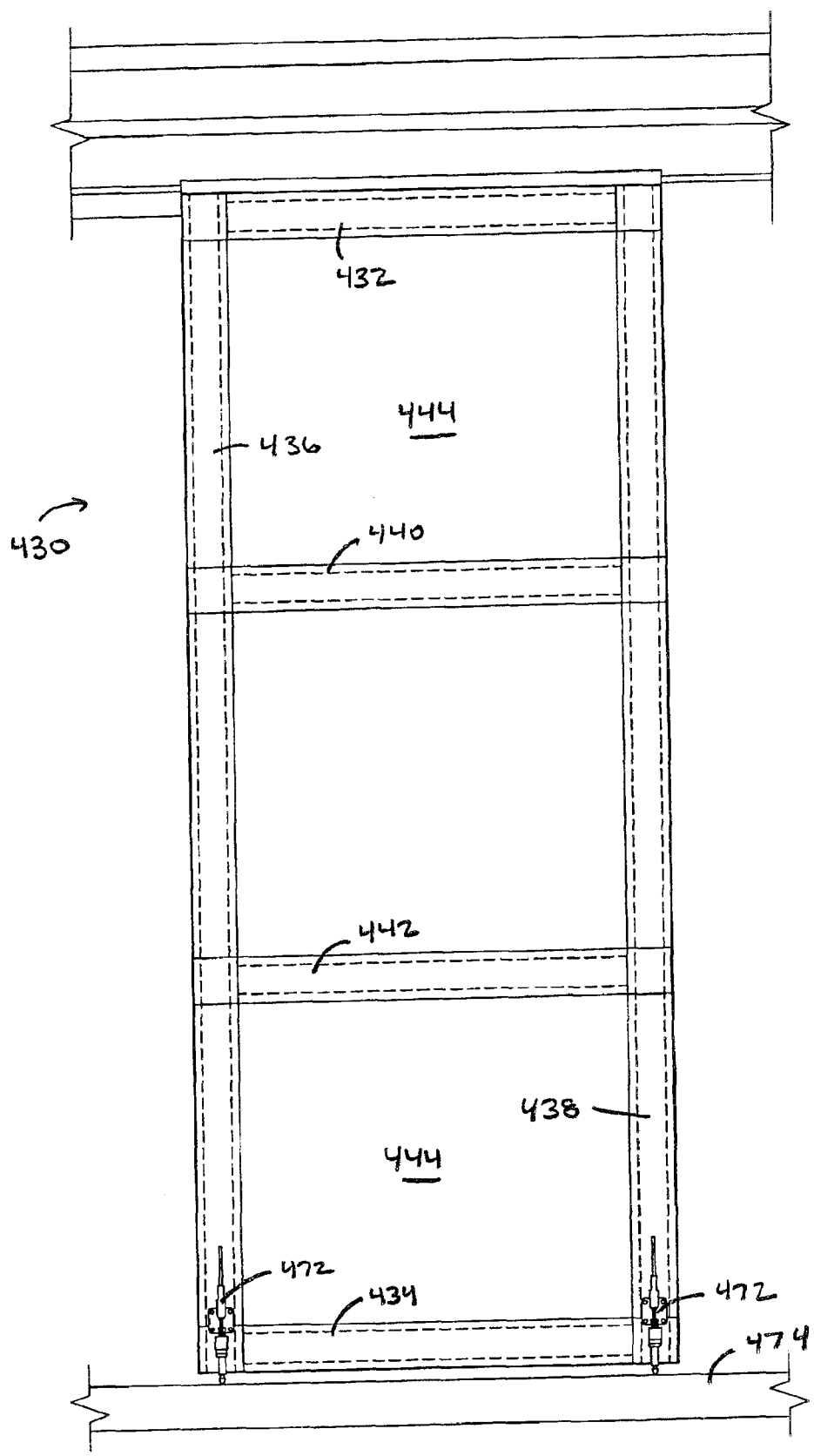
FIG. 10 shows an elevation view of a movable wall panel according to one embodiment of the present invention.

Each slidable wall panel 430 is constructed as shown in FIG. 10 in this embodiment. Each of these wall panels is approximately 43 inches wide and varies in height depending on the height of the room. Each wall panel includes top and bottom framing members 432, 434, left and right side framing members 436, 438 and cross framing members 440, 442. The backside of wall panel 430 is entirely covered with a 28 gauge galvanized sheet metal back panel 444.

Each framing member and cross member in this embodiment is formed as a "C" shaped channel member with one open side. It should be noted that the sharp outer edges 446 of back panel 444 are completely enclosed inside of channel framing members 432, 434, 436 and 438 in this embodiment (see FIGS. 11 and 12). This is done to keep the sharp panel edges 446 from being exposed to firefighters.

Figure 11:
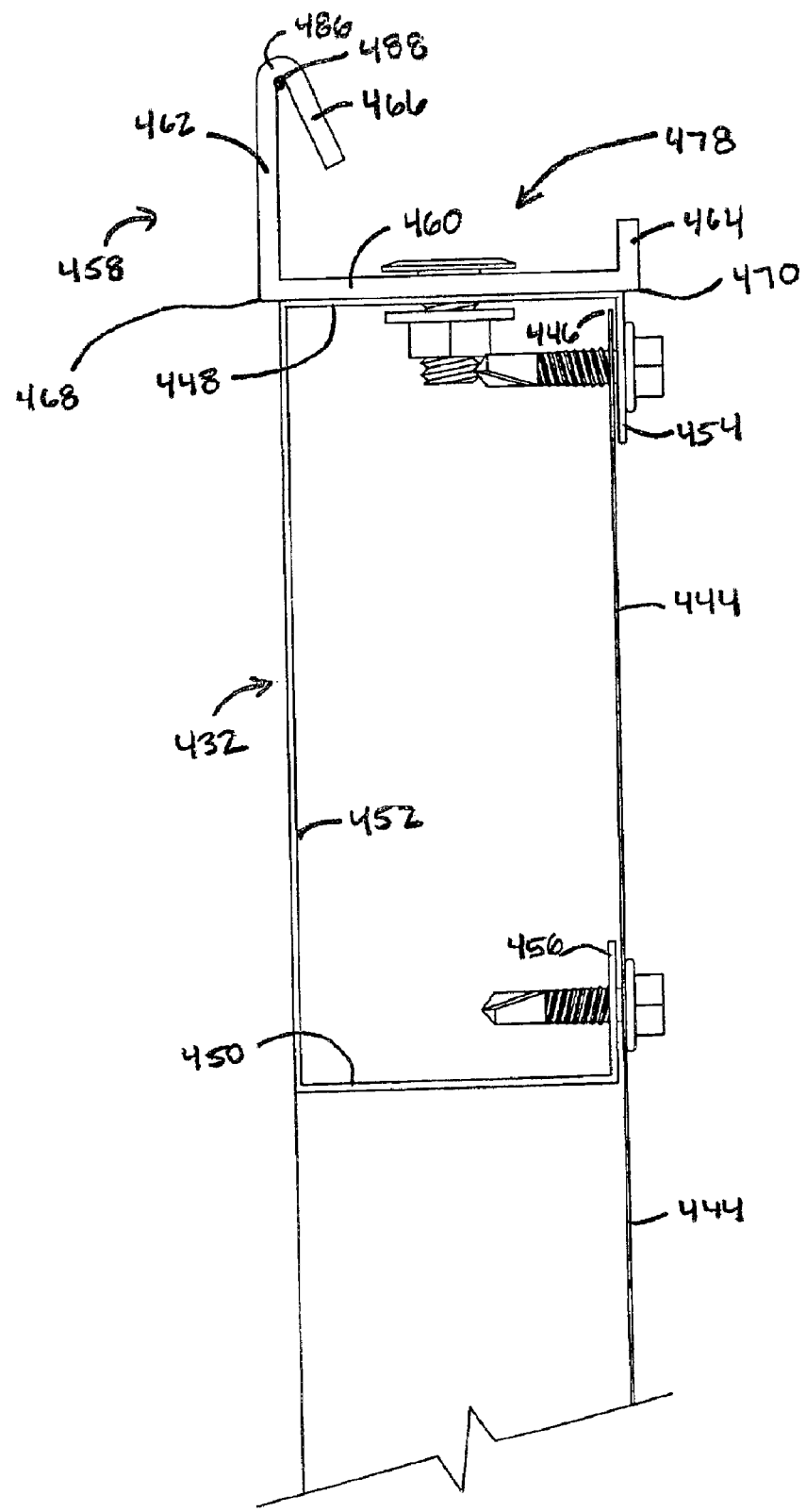
FIG. 11 shows a cross-sectional view at the top of a wall panel track according to one embodiment of the present invention.
Figure 12:
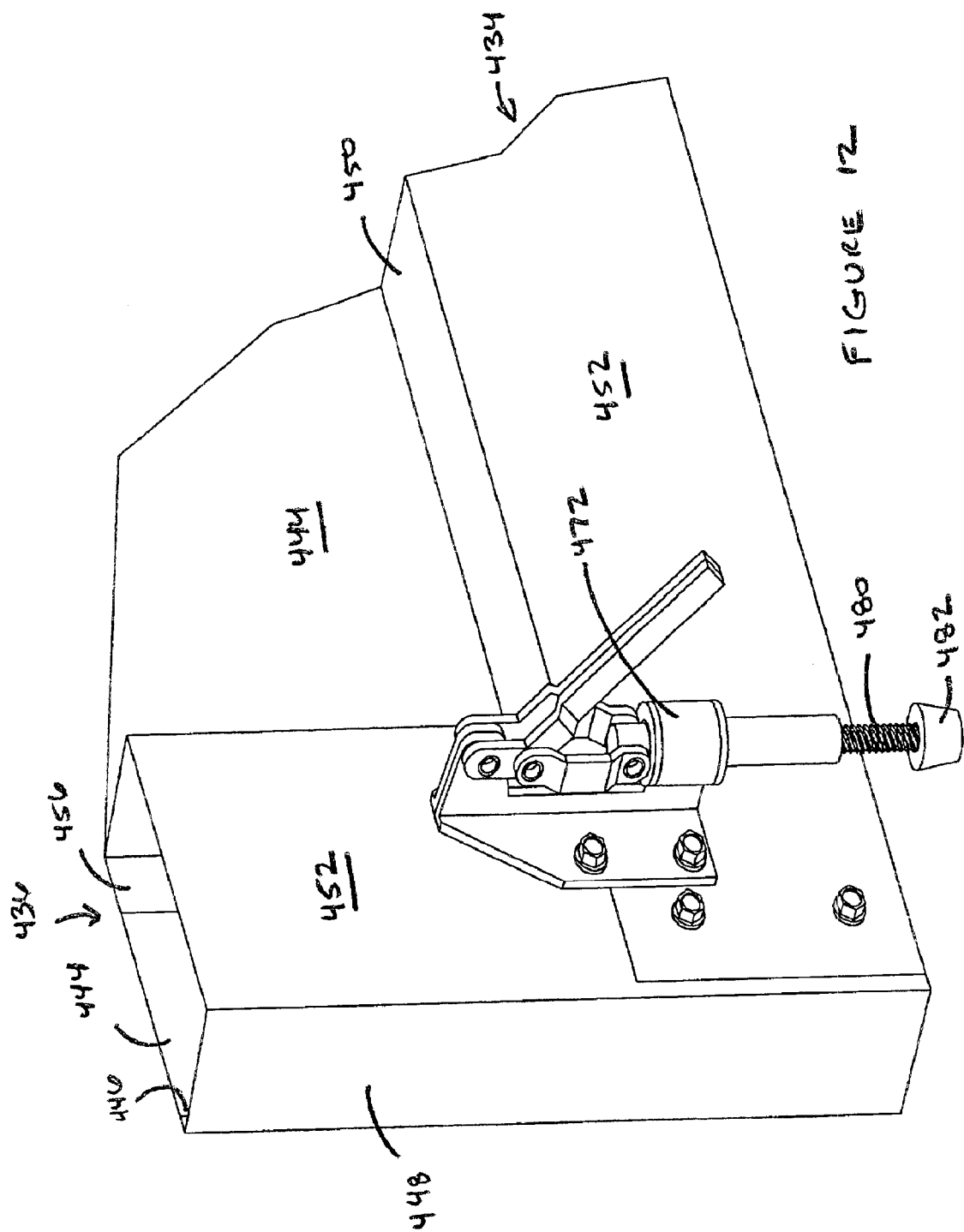
FIG. 12 shows an isometric view of a wall panel having a pressure element according to one embodiment of the present invention.

More specifically, as shown in FIG. 11 using framing member 432 for illustrative purposes, each framing member 432, 434, 436 and 438 has a "C" shaped rectangular cross section and includes an outer sidewall 448 and an inner sidewall 450 connected to each other by a front wall 452. Sidewalls 448 and 450 are disposed perpendicular to panel 444 while front wall 452 is disposed parallel to panel 444. For each framing member, outer sidewall 448 is slightly wider than inner sidewall 450.

A first flange 454 is perpendicularly attached to the end of outer sidewall 448 and extends inward toward inner sidewall 450. Similarly, a second flange 456 is perpendicularly attached to the end of inner sidewall 450 and extends outward toward outer sidewall 448. Because outer sidewall 448 is wider than inner sidewall 450, flanges 454 and 456 are not located in the same plane with each other. Rather, flange 456 is located in a plane that is closer to front wall 452 than is flange 454.

Panel 444 is actually mounted to framing member 432 in a plane that is located between the planes defined by flanges 454 and 456. More specifically, panel 444 is slid into place over flange 456 and under flange 454. Panel 444 is then secured to framing member 432 such that flange 456 is disposed up against the inside surface of panel 444 while flange 454 is disposed up against the outside surface of panel 444. The sharp outer edge 446 of panel 444 is thereby completely covered by flange 454 and is enclosed inside of framing member 432. This same type of construction is utilized around the entire perimeter of wall panel 430 and thus all of the sharp outer edges 446 of back panel 444 are enclosed.

Mounted to top frame member 432 of wall panel 430 is a wall panel track 458 as best shown in FIG. 11. Wall panel track 458 is configured to slidably engage with hanger tracks 400 and 404. Wall panel track 458 is attached to (mounted to) the top surface of top frame member 432 using conventional fasteners such as screws or bolts.

Each wall panel track includes a horizontal (or substantially horizontal) bottom flange or bottom wall 460, a first upwardly directed front sidewall or front flange 462, a second upwardly directed rear sidewall or rear flange 464 and a downwardly angled flange member or hook member 466. Flange member 466 is angled downward in this embodiment thus forming an acute angle with front sidewall 462. In other embodiments, flange member 466 extends horizontally or substantially horizontally from front sidewall 462.

The two sidewalls 462, 464 of wall panel track 458 are disposed at opposite edges 468 and 470 of bottom wall 460. The combination of front sidewall 462, bottom wall 460 and rear sidewall 464 form a channel 478 on track 458. During slidable engagement of track 458 on track 400, bottom wall 416 (and channel 428) are disposed inside of channel 478. It should be noted that rear sidewall 464 is purposely shorter than front wall 462 in this embodiment for reasons discussed later herein.

Hook member 466 is attached to the top end of front sidewall 462 and projects inward over bottom wall 460 and toward rear sidewall 464. During sliding engagement of wall panel track 458 with ceiling track 400 (or 404), front sidewall 420 on ceiling track 400 is disposed between downwardly directed flange member 466 and front sidewall 462 of wall panel track 458. Stated another way, the combination of flange member 466 and front sidewall 462 form a hook member that hooks on to, or over the top of, front sidewall 420 of hanger track 400 during slidable engagement of track 458 on track 400.

In other embodiments, front and rear sidewalls 462, 464 are angled, are substantially vertical, and/or are attached to bottom wall 460 at a point near the outer edges 468, 470 respectively or at a point intermediate to outer edges 468, 470. Likewise, in other embodiments, bottom wall 460 is angled upward or downward.

In addition to wall panel track 458, a pair of locking devices 472 are mounted at or near the bottom of each wall panel 430. The locking devices used in this embodiment and shown in FIG. 12 in detail are push/pull type toggle clamps that act as a pressure device (or a compression device) between the movable wall panel and the floor. One such clamp is the Model 603 straight-line action toggle clamp manufactured and sold by De-Sta-Co Industries of Birmingham, Mich.

Compression device, as used herein, means any device that locks or secures a movable wall in place by pressing or squeezing the movable wall between two other surfaces (e.g., the floor and the ceiling for example). Similarly, the term pressure device, as used herein, means any device that locks or secures a movable wall in place by exerting force on the movable wall through direct contact with another surface.

The present invention is not limited to pressure or compression devices, however, and other types of locking devices can be used. For example, in another embodiment, retractable spindles are provided on the movable wall and are inserted in holes in the floor to lock and secure the movable walls in place. Likewise, the present invention does not require a pair of locking devices on each wall panel. In an alternative embodiment of the present invention, only one locking device 472 is provided on each wall panel. In other embodiments, no locking devices are used or the locking devices are disposed somewhere other than near the bottom of wall panel 430 such as near the top of wall panel 430 or on the floor or on the ceiling.

Locking devices 472 are provided to secure or lock movable wall panel 430 in place at a desired location in the room. In this embodiment, this is accomplished by pressing the movable wall between the floor joists 402 located at the top of the room above wall panel 430 and the floor 474 located at the bottom of the room below wall panel 430. More specifically, in this embodiment, activation of each compression device 472 forces movable wall panel 430 up against floor joist 402 thus locking the wall panel in place between the ceiling track 400 (or 404) located at the top of the room and the floor 474 located at the bottom of the room.

Each pressure clamp 472 includes an adjustable spindle 480 and a rubber pad 482. The rubber pad 482 is mounted at the bottom end of retractable spindle 480. One benefit to using adjustable locking devices is that each locking device on wall panel 430 can be adjusted to account for the slope in the floor that occurs over the width of the wall panel. This permits both sides of the wall panel to be locked or secured in place between the sloping floor and the ceiling. Another benefit to using these adjustable locking devices is that the amount of pressure applied to lock or secure the movable wall in place between the floor and ceiling can be adjusted by simple adjusting the length of spindle 480.

The terms locked or secured, as used herein, mean fixed at given location. For instance, with respect to the top of the movable wall in the embodiment described above, locked or secured means that the top of the movable wall can no longer slide along the track. With respect to the bottom of the movable wall, locked or secured means that the bottom of the wall cannot swing freely back and forth.

Figure 13:
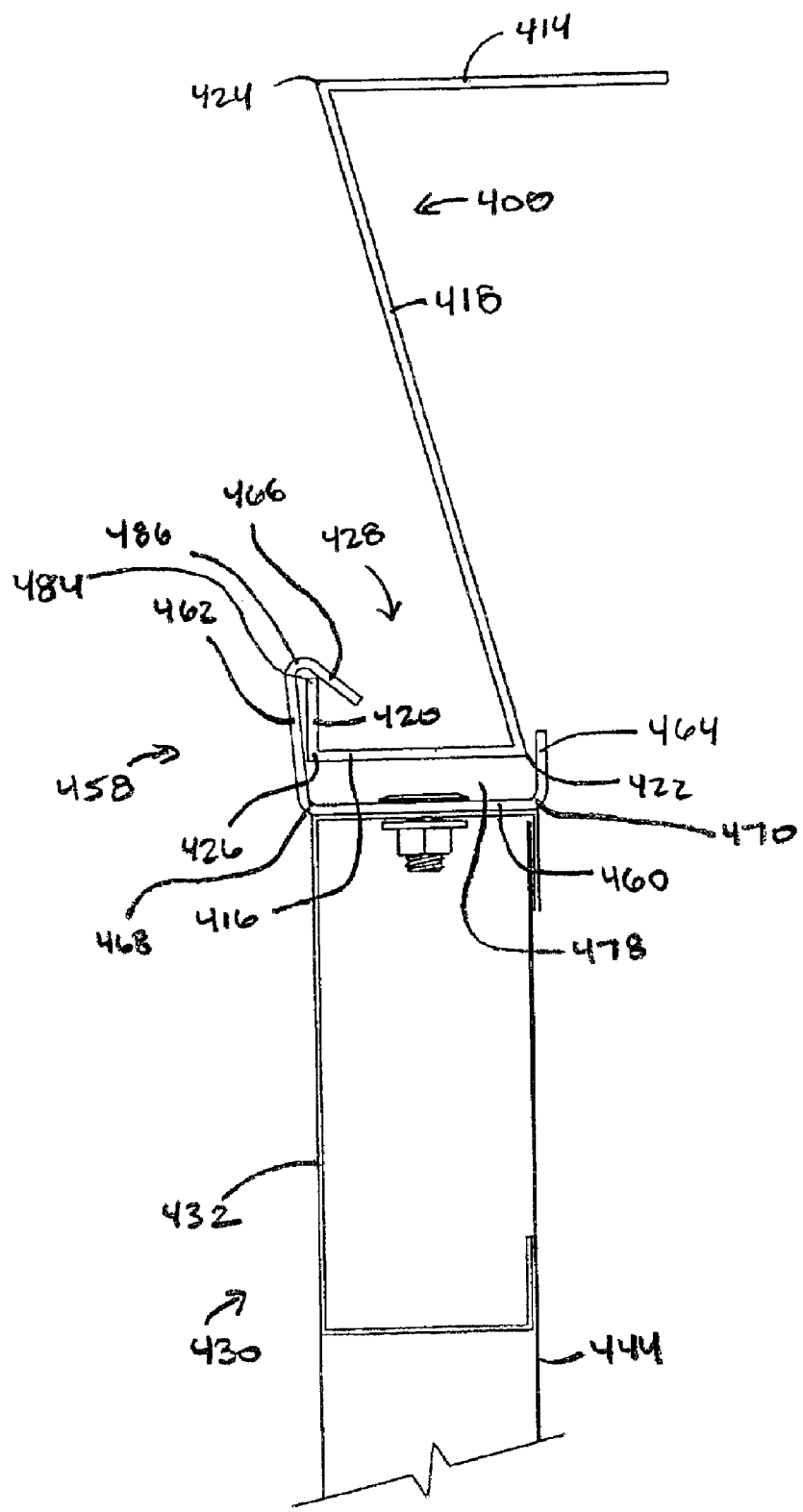
FIG. 13 shows a cross sectional view of a wall panel track in slidable engagement with a hanger track according to one embodiment of the present invention.
Figure 14:
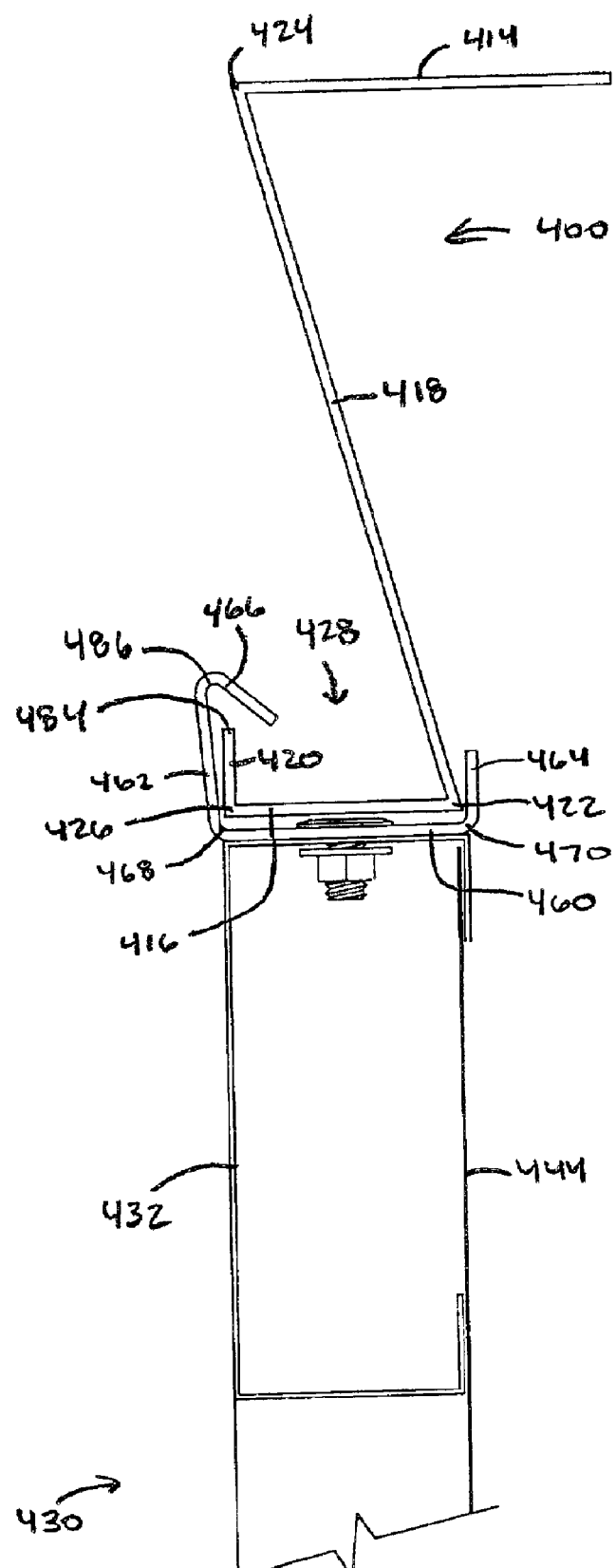
FIG. 14 shows a cross sectional view of a wall panel track locked in place on a hanger track according to one embodiment of the present invention.
Figure 15:
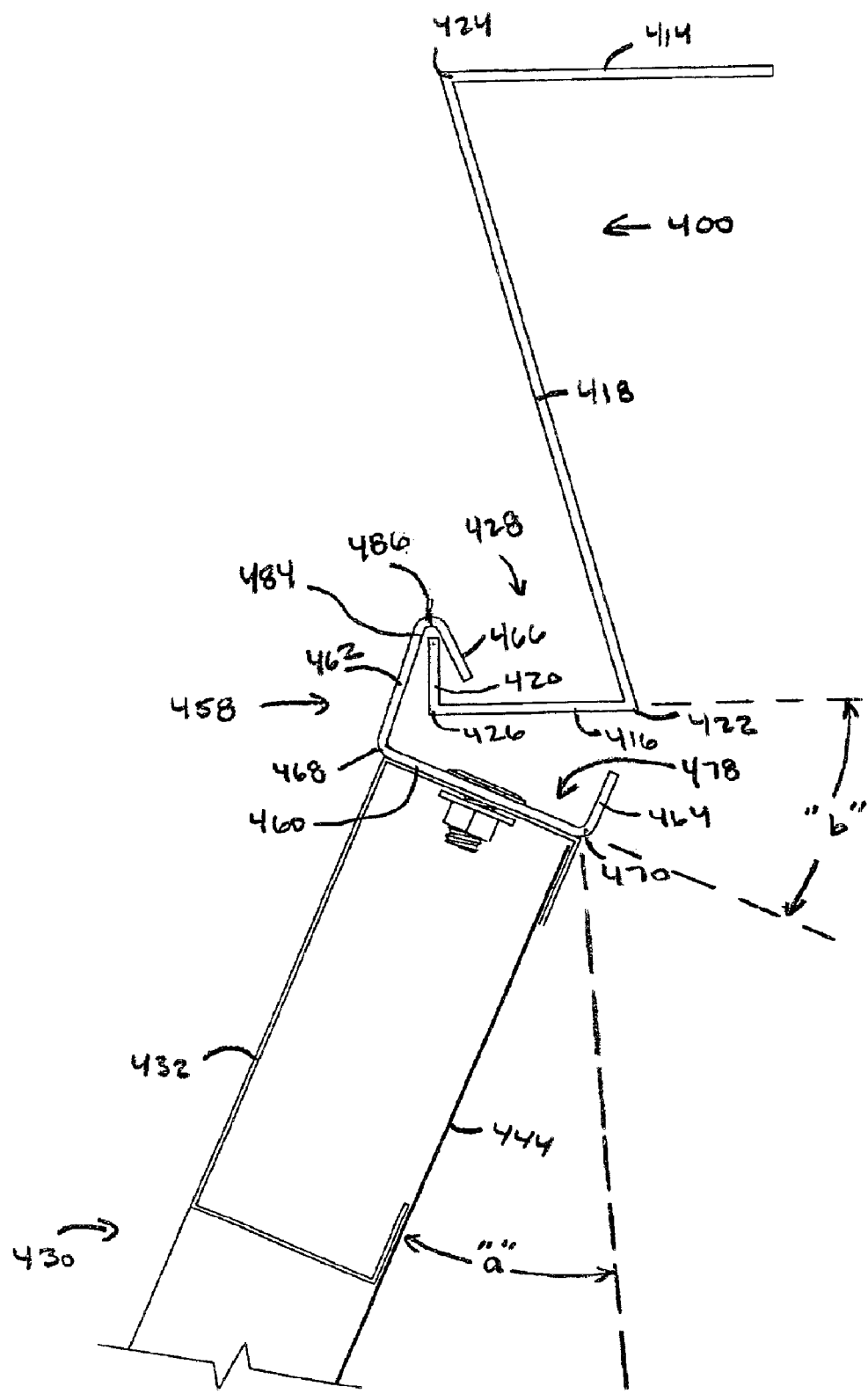
FIG. 15 shows a cross sectional view of a wall panel track being disengaged and removed from a hanger track according to one embodiment of the present invention.

Slidable installation of the wall panels on the hanger tracks will now be described in detail with the aid of FIGS. 13–15. To slidably engage wall panel track 458 with hanger track 400, wall panel 430 must be held at an angle to floor 474 with the bottom of wall panel 430 angled away from floor 474 (see angle "a" in FIG. 15). With wall panel 430 angled upward and outward away from floor 474, wall panel track 458 is also tilted at an angle relative to track 400 (see angle "b" in FIG. 15).

While being held at an angle, wall panel 430 is raised upward until flange 466 on wall panel track 458 can be positioned over the top end 484 of front sidewall 420 on hanger track 400. With front sidewall 420 disposed under flange 466, wall panel 430 is lowered until top end 484 of front sidewall 420 contacts lip flange 466 at or near the junction 486 between flange 466 and front sidewall 462.

At this point, wall panel 430 is allowed to rotate downward to its normal free hanging position on hanger track 400 (e.g., vertical or substantially vertical). As wall panel 430 rotates downward to its normal vertically hanging position, rear sidewall 464 is brought into its normal operating position adjacent to rear outer edge 422 of bottom wall 416. Note that wall panel 430 rotates axially downward to its normal free hanging position about an axis 488 that passes approximately through junction 486 in this embodiment. Axis 488 is parallel with axis 401 of hanger track 400.

With wall panel 430 in its normal free hanging position, front sidewall 420 is disposed between the hook formed by downwardly angled flange 466 and front sidewall 462. At the same time, rear sidewall 464 on wall panel track 458 is disposed adjacent to, and on the outside of rear outer edge 422 and rear sidewall 418 of hanger track 400. Rear sidewall 464 also extends upward above bottom wall 416 when wall panel 430 is in its free hanging position.

In the event that wall panel 430 is bumped laterally or raised upward during training by a firefighter, the contact of rear sidewall 464 and/or front sidewall 462 with the outer edges 422 and/or 426 respectively of bottom wall 416 prevent wall panel 430 (and wall panel track 458) from disengaging (e.g., from falling off of the track) from hanger track 400.

Thus, the only way to remove wall panel track 458 from hanger track 400 is to angle wall panel 430 outward and upward away from its normal vertical hanging position thereby allowing rear sidewall 464 to clear rear outer edge 422. This in turn allows flange 466 and the hook formed by flange 466 and sidewall 462) to be raised sufficiently to clear front sidewall 420.

Rear sidewall 464 is shorter than front sidewall 462 in this embodiment. This allows rear sidewall 464 to easily clear rear outer edge 422 of bottom wall 416 when wall panel 430 is rotated upward for removal. It should be noted, however, that even though rear sidewall 464 is shorter than front sidewall 462, its length is sufficient to engage the outer edge 422 of track 400 when wall panel 430 is hanging freely from track 400. This engagement prevents track 458 from inadvertently disengaging from track 400 in the event that the back side of wall panel 430 is forcibly bumped.

To position and secure the wall panel 430 at a desired location in the room, wall panel 430 is first slid to the desired location in the room. Once positioned, locking devices 472 are activated. Activation of locking devices 472 forces wall panel 430 upward and wedges it between the floor joist or joists and the floor. More specifically, bottom wall 460 of wall panel track 458 is forced upward against (abuts) bottom wall 416 of ceiling track 400 when locking devices 472 are activated. In this manner, both the top and bottom of wall panel 430 are secured in place by activation of locking device 472. Wall panel 430 is now locked in place and can no longer slide along track 400 (or 404).

To move or remove wall panel 430, locking devices 472 are first deactivated. Deactivation of locking device 472 allows wall panel 430 to drop to its normal hanging position. From its normal hanging position, wall panel 430 can be slid along track 400 to a new location or it can be removed from hanger track 400 altogether.

Numerous modifications may be made to the present invention which still fall within the intended scope hereof. Thus, it should be apparent that there has been provided in accordance with the present invention a firefighter training building having a reconfigurable floor plan that fully satisfies the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The the embodiments of the invention in which an exclusive property or privilege is claimed are defined as follows:

1. A room partitioning system for a firefighter training building comprising:
    a first track, wherein the first track includes a first bottom wall having first and second opposing outer edges, and a first sidewall extending upward and having top and bottom ends, wherein the bottom end is attached to the first bottom wall;
    a second track configured for slidable engagement with the first track, wherein the second track includes a second bottom wall, second and third sidewalls extending upward from the second bottom wall, and a flange member attached to the second sidewall and extending inward above the second bottom wall from the second sidewall toward the third sidewall, wherein during slidable engagement of the second track with the first track, the second sidewall is disposed adjacent to, and extends upward above, the first outer edge of the first bottom wall, the third sidewall is disposed adjacent to, and extends upward above, the second outer edge of the first bottom wall, and the flange member is disposed over the top of the first sidewall.

2. The apparatus of claim 1 wherein the first sidewall is attached to the first bottom wall at the first outer edge of the first bottom wall.

3. The apparatus of claim 1 wherein the flange member is angled downward from horizontal.

4. The apparatus of claim 1 wherein the third sidewall is shorter than the second sidewall.

5. The apparatus of claim 1 wherein the first sidewall is disposed between the second sidewall and the flange member during slidable engagement of the second track with the first track.

6. The apparatus of claim 1 further comprising a movable wall attached to the second track.

7. The apparatus of claim 6 wherein the first track is configured to be attached to a structure disposed above the movable wall.

8. The apparatus of claim 6 further comprising a locking device, wherein activation of the locking device forces the second bottom wall of the second track upward toward the first bottom wall of the first track.

9. The apparatus of claim 8 wherein the locking device is a pressure device.

10. The apparatus of claim 6 further comprising a locking device, wherein deactivation of the locking device allows the movable wall to slide along the first track and activation of the locking device prohibits the movable wall from sliding along the first track.

11. A room partitioning system for a firefighter training building comprising:
    a first track having a bottom wall and a first upwardly directed sidewall;
    a movable wall; and
    a second track attached to the movable wall and configured for slidable engagement with the first track, wherein the second track includes a second upwardly directed sidewall and a third upwardly directed sidewall shorter than the second upwardly directed sidewall, wherein the bottom wall is disposed between the second and third upwardly directed sidewalls during slidable engagement of the second track with the first track such that the second track can be disengaged from the first track only when the second track is tilted at an angle relative to the first track.

12. The apparatus of claim 11 wherein the first upwardly directed sidewall includes a top end and the second track includes a flange member attached to the second sidewall, wherein during slidable engagement of the second track with the first track, the flange member is disposed over the top end of the first upwardly directed sidewall.

13. A room partitioning system for a firefighter training building comprising:
    a first track having a first upwardly directed channel;
    a second track configured for slidable engagement with the first track wherein the second track includes a second upwardly directed channel, wherein during slidable engagement of the second track with the first track, the first channel is disposed in the second channel; and
    a movable wall attached to the second track.

14. The apparatus of claim 13 wherein the second track further includes an inwardly directed flange member disposed such that during slidable engagement of the second track with the first track, the flange member extends from the second channel over the first channel.

15. A firefighter training apparatus comprising:
    a training building, wherein the training building is specially designed for the purpose of training firefighters;
    a movable wall disposed inside of the training building wherein the wall can be moved to change the floor plan of the training building;
    a first track mounted in the training building, wherein the first track includes a first bottom wall having first and second opposing outer edges, and a first sidewall extending upward and having top and bottom ends, wherein the bottom end is attached to the first bottom wall; and
    a second track attached to the movable wall and configured for slidable engagement with the first track, wherein the second track includes a second bottom wall, second and third sidewalls extending upward from the second bottom wall, and
    a flange member attached to the second sidewall and extending inward above the second bottom wall from the second sidewall toward the third sidewall, wherein during slidable engagement of the second track with the first track, the second sidewall is disposed adjacent to, and extends upward above, the first outer edge of the first bottom wall, the third sidewall is disposed adjacent to, and extends upward above, the second outer edge of the first bottom wall, and the flange member is disposed over the top of the first sidewall.

16. A firefighter training apparatus comprising:
    a training building including a floor and a ceiling, wherein the training building is specially designed for the purpose of training firefighters;

a movable wall including a locking device and disposed inside of the training building, wherein the wall can be moved to change the floor plan of the training building, and further wherein activation of the locking device locks the movable wall between the floor and the ceiling;

a first track mounted in the training building, wherein the first track includes a first bottom wall having first and second opposing outer edges, and a first sidewall extending upward and having top and bottom ends, wherein the bottom end is attached to the first bottom wall; and a second track attached to the movable wall and configured for slidable engagement with the first track, wherein the second track includes a second bottom wall, second and third sidewalls extending upward from the second bottom wall, and a flange member attached to the second sidewall and extending inward above the second bottom wall from the second sidewall toward the third sidewall, wherein during slidable engagement of the second track with the first track, the second sidewall is disposed adjacent to, and extends upward above, the first outer edge of the first bottom wall, the third sidewall is disposed adjacent to, and extends upward above, the second outer edge of the first bottom wall, and the flange member is disposed over the top of the first sidewall.

17. A firefighter training apparatus comprising:

a training building, wherein the training building is specially designed for the purpose of training firefighters;

a movable wall disposed inside of the training building, wherein the movable wall includes a top and a bottom and further includes a locking device, wherein the wall can be moved to change the floor plan of the training building, and further wherein activation of the locking device secures the wall both at the top and at the bottom;

a first track mounted in the training building, wherein the first track includes a first bottom wall having first and second opposing outer edges, and a first sidewall extending upward and having top and bottom ends, wherein the bottom end is attached to the first bottom wall;

a second track attached to the movable wall and configured for slidable engagement with the first track, wherein the second track includes a second bottom wall, second and third sidewalls extending upward from the second bottom wall, and a flange member attached to the second sidewall and extending inward above the second bottom wall from the second sidewall toward the third sidewall, wherein during slidable engagement of the second track with the first track, the second sidewall is disposed adjacent to, and extends upward above, the first outer edge of the first bottom wall, the third sidewall is disposed adjacent to, and extends upward above, the second outer edge of the first bottom wall, and the flange member is disposed over the top of the first sidewall.

18. A room partitioning system for a firefighter training building comprising:

a first track having a first channel;

a second track configured for slidable engagement with the first track, wherein the second track includes a second channel, wherein during slidable engagement of the second track with the first track, the first channel is disposed in the second channel, and further wherein the second channel is defined by a bottom wall, a first sidewall and a second sidewall, wherein the second sidewall is shorter than the first sidewall; and a movable wall attached to the second track.

19. The apparatus of claim 15 wherein the first sidewall is attached to the first bottom wall at the first outer edge of the first bottom wall.

20. The apparatus of claim 15 wherein the flange member is directed downward.

21. The apparatus of claim 15 wherein the third sidewall is shorter than the second sidewall.

22. The apparatus of claim 15 wherein the first sidewall is disposed adjacent to the second sidewall and underneath the flange member during slidable engagement of the second track with the first track.

23. The apparatus of claim 15 wherein the training building is non-movable.

24. An apparatus comprising:

a building;

a movable wall disposed inside of the building wherein the movable wall can be moved to change the floor plan of the building;

a first track mounted in the building, wherein the first track includes a first upwardly directed channel; and a second track attached to the movable wall and configured for engagement with the first track, wherein the second track includes a second upwardly directed channel, wherein during engagement of the second track with the first track, the first channel is disposed in the second channel.

25. The apparatus of claim 24 wherein the second track further includes an inwardly directed flange member disposed such that during engagement of the second track with the first track, the flange member extends from the second channel over the first channel.

26. The apparatus of claim 25 wherein the inwardly directed flange member is angled downward.

27. The apparatus of claim 24 wherein the second track is configured for removal from the first track without the use of tools.

28. The apparatus of claim 24 wherein the movable wall is comprised of a plurality of individual movable wall panels.

29. The apparatus of claim 24 wherein the wall is movable to a first position defining a first floor plan, and further wherein the movable wall is configured to be locked in the first position.

30. The apparatus of claim 29 wherein the apparatus further includes a locking device, wherein activation of the locking device locks the movable wall in the first position.

31. The apparatus of claim 30 wherein the locking device is a pressure device.

32. The apparatus of claim 30 wherein the locking device is disposed near the bottom of the movable wall.

33. The apparatus of claim 24 wherein the building includes a floor and a ceiling and the movable wall is configured to be secured between the floor and the ceiling.

34. The apparatus of claim 33 wherein the apparatus includes a locking device, wherein activation of the locking device secures the movable wall between the floor and the ceiling.

35. The apparatus of claim 34 wherein the locking device is a compression device.

36. The apparatus of claim 34 wherein after activation, the locking device is disposed between the movable wall and the floor.

37. The apparatus of claim 24 wherein the building is a training building specially designed for the purpose of training firefighters.

38. The apparatus of claim 37 wherein the building further includes a live fire burn room.

39. The apparatus of claim 24 wherein the second track is configured for slidable engagement with the first track.

40. The apparatus of claim 24 wherein the second track is configured for hanging engagement with the first track.

41. The apparatus of claim 24 wherein the building is non-movable.

42. An apparatus comprising:

a building;

a movable wall disposed inside of the building wherein the movable wall can be moved to. change the floor plan of the building;

a first track mounted in the building and having a first channel;

a second track attached to the movable wall and configured for engagement with the first track, wherein the second track includes a second channel, wherein during engagement of the second track with the first track, the first channel is disposed in the second channel, and further wherein the second channel is defined by a bottom wall, a first sidewall and a second sidewall, wherein the second sidewall is shorter than the first sidewall.

43. The apparatus of claim 42 wherein the second track further includes an inwardly directed flange member disposed such that during engagement of the second track with the first track, the flange member extends from the second channel over the first channel.

44. The apparatus of claim 42 wherein the first track includes a third upwardly directed sidewall having a top end and the second track includes a flange member attached to the first sidewall, wherein the flange member is disposed such that during engagement of the second track with the first track, the flange member is disposed over the top end of the third upwardly directed sidewall.

45. The apparatus of claim 42 wherein the second track is configured for removal from the first track without the use of tools.

46. The apparatus of claim 42 wherein the building is a training building specially designed for the purpose of training firefighters.

47. The apparatus of claim 46 wherein the building further includes a live fire burn room.

48. The apparatus of claim 42 wherein the second track is configured for slidable engagement with the first track.

49. The apparatus of claim 42 wherein the second track is configured for hanging engagement with the first track.

50. The apparatus of claim 42 wherein the building is non-movable.

* * * * *